US012147258B2

(12) United States Patent
Tseng

(10) Patent No.: US 12,147,258 B2
(45) Date of Patent: Nov. 19, 2024

(54) OVERCURRENT DETECTION CIRCUIT AND LOW-DROPOUT VOLTAGE REGULATOR SYSTEM USING THE SAME

(71) Applicant: NUVOTON TECHNOLOGY CORPORATION, Hsinchu (TW)

(72) Inventor: Hua-Chun Tseng, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 239 days.

(21) Appl. No.: 17/972,865

(22) Filed: Oct. 25, 2022

(65) Prior Publication Data

US 2023/0221745 A1 Jul. 13, 2023

(30) Foreign Application Priority Data

Nov. 18, 2021 (TW) ................................ 110142876

(51) Int. Cl.
*G05F 1/575* (2006.01)
*G05F 1/56* (2006.01)
*G05F 1/573* (2006.01)

(52) U.S. Cl.
CPC .............. *G05F 1/575* (2013.01); *G05F 1/561* (2013.01); *G05F 1/573* (2013.01)

(58) Field of Classification Search
CPC ........... G05F 1/575; G05F 1/561; G05F 1/573
See application file for complete search history.

(56) References Cited

U.S. PATENT DOCUMENTS

| | | | | |
|---|---|---|---|---|
| 10,530,249 B1 * | 1/2020 | Lee | H02M 1/08 | |
| 10,686,371 B1 * | 6/2020 | Lee | G05F 1/575 | |
| 2014/0285165 A1 * | 9/2014 | Wang | G05F 1/575 | 323/274 |
| 2015/0137781 A1 * | 5/2015 | Qu | G05F 1/56 | 323/280 |
| 2019/0379219 A1 * | 12/2019 | Snyder | H02J 7/00304 | |
| 2021/0405672 A1 * | 12/2021 | Hsu | G05F 1/575 | |
| 2022/0206084 A1 * | 6/2022 | Tan | H03K 19/20 | |
| 2022/0216738 A1 * | 7/2022 | Yang | H02J 50/12 | |
| 2022/0247387 A1 * | 8/2022 | Takahashi | H01L 29/7815 | |

* cited by examiner

*Primary Examiner* — Rafael O De Leon Domenech
(74) *Attorney, Agent, or Firm* — MUNCY, GEISSLER, OLDS & LOWE, P.C.

(57) ABSTRACT

An overcurrent detection device of the present disclosure has two charge storage circuits, a control module and a counter circuit. The control module controls and provides charge paths of the two charge storage circuits, so that the two charge storage circuits are charged by a reference current and a sensed current respectively, wherein the sensed current is generated by an output current of a low-dropout regulator. The counter circuit obtains a voltage of the charge storage circuit charged by the sensed current, and counts accordingly. When the counting of the counter circuit reaches a specific value, the counter circuit outputs an overcurrent detection signal. When the output current is an overcurrent, the counter circuit first counts to the specific value before the charge storage circuit which is charged by the reference current is charged to a specific voltage.

17 Claims, 3 Drawing Sheets

OVERCURRENT DETECTION CIRCUIT AND LOW-DROPOUT VOLTAGE REGULATOR SYSTEM USING THE SAME

CROSS-REFERENCE TO RELATED APPLICATION

This application claims the priority from the TW Patent Application No. 110142876, filed on Nov. 11, 2021 and all contents of such TW Patent Application are included in the present disclosure.

BACKGROUND

1. Field of the Invention

The present disclosure relates to an overcurrent detection circuit of a low-dropout regulator, in particular to, an overcurrent detection circuit which does not need to use an operational amplifier and a low-dropout voltage regulator system using the overcurrent detection circuit.

2. Description of the Related Art

To ensure transient regulation, line transient regulation and other capabilities of a low-dropout regulator (LDO) and stability of the low-dropout regulator (LDO) under various loads to meet certain requirements, overcurrent detection is performed to determine whether the output current is too high, and the low-dropout regulator is used to adjust and compensate the excessive output current correspondingly.

The output current sensing method of the low-dropout regulator in the prior art is to stably replicate the current flowing through a power device of the low-dropout regulator through an operational amplifier. Then, the current is passed through a resistor to convert into a voltage to generate a detection voltage. Because the overcurrent detection is required, it is necessary to determine whether a sensed current generated by the output current exceeds a predetermined current through a voltage comparator, or through a current comparator.

The above method requires the operational amplifier and a comparator to be added to a circuit of the original low-dropout regulator. Hence, the area required for the overall circuit and the demand for quiescent current are increased. At the same time, the stability of a current sensing path needs to be considered additionally, which causes many difficulties and restrictions in the design. Furthermore, the gain and input offset voltage of the above comparator will affect important parameters of the overcurrent detection level, so there are still more difficulties in design.

SUMMARY

The purpose of the present disclosure is to provide an overcurrent detection circuit and a low-dropout voltage regulator system using the overcurrent detection circuit, which can realize the overcurrent detection of the low-dropout regulator at a lower cost and in a simpler way.

An embodiment of the present disclosure provides an overcurrent detection circuit, which comprises a first charge storage circuit, a second charge storage circuit, a counter circuit and a control module. The first charge storage circuit is configured to be charged by a reference current, wherein it takes a first specific time to charge a first voltage of the first charge storage circuit from a first initial voltage to a first specific voltage. The second charge storage circuit is configured to be charged by a sensed current, wherein it takes a second specific time to charge a second voltage of the second charge storage circuit from a second initial voltage to a second specific voltage. The second specific time is less than the first specific time, and the sensed current is generated by an output current of a low-dropout regulator. The counter circuit is electrically connected to the second charge storage circuit, and is configured to receive the second voltage and count according to the second voltage. The counter circuit outputs an overcurrent detection signal when the counter circuit counts to a specific value. The control module is electrically connected to the first charge storage circuit, the second charge storage circuit and counter circuit. The control module is configured to control and provide a charge path of the first charge storage circuit and a charge path of the second charge storage circuit. In the case of the output current being an overcurrent, the counter circuit first counts to the specific value before the first voltage is charged to the first specific voltage. Also, in the case of the output current not being the overcurrent, the first voltage is first charged to the first specific voltage before the counter circuit counts to the specific value.

An embodiment of the present disclosure further provides a low-dropout voltage regulator system, which comprises a low-dropout regulator and the overcurrent detection circuit. Moreover, the overcurrent detection circuit is electrically connected to the low-dropout regulator.

In conclusion, compared with the prior art, the overcurrent detection circuit of the present disclosure is a technical solution for realizing overcurrent detection without using an operational amplifier and a comparator, which has advantages of low design complexity, low consumption, low circuit area, low quiescent current and so on.

To further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable persons with ordinary knowledge in the technical field of the present disclosure to further understand the present disclosure, and are incorporated into and constitute a part of the specification of the present disclosure. The drawings illustrate exemplary embodiments of the present disclosure, and are used to explain the principle of the present disclosure together with the description of the present disclosure.

DESCRIPTION OF THE PREFERRED EMBODIMENTS

Figure 1:
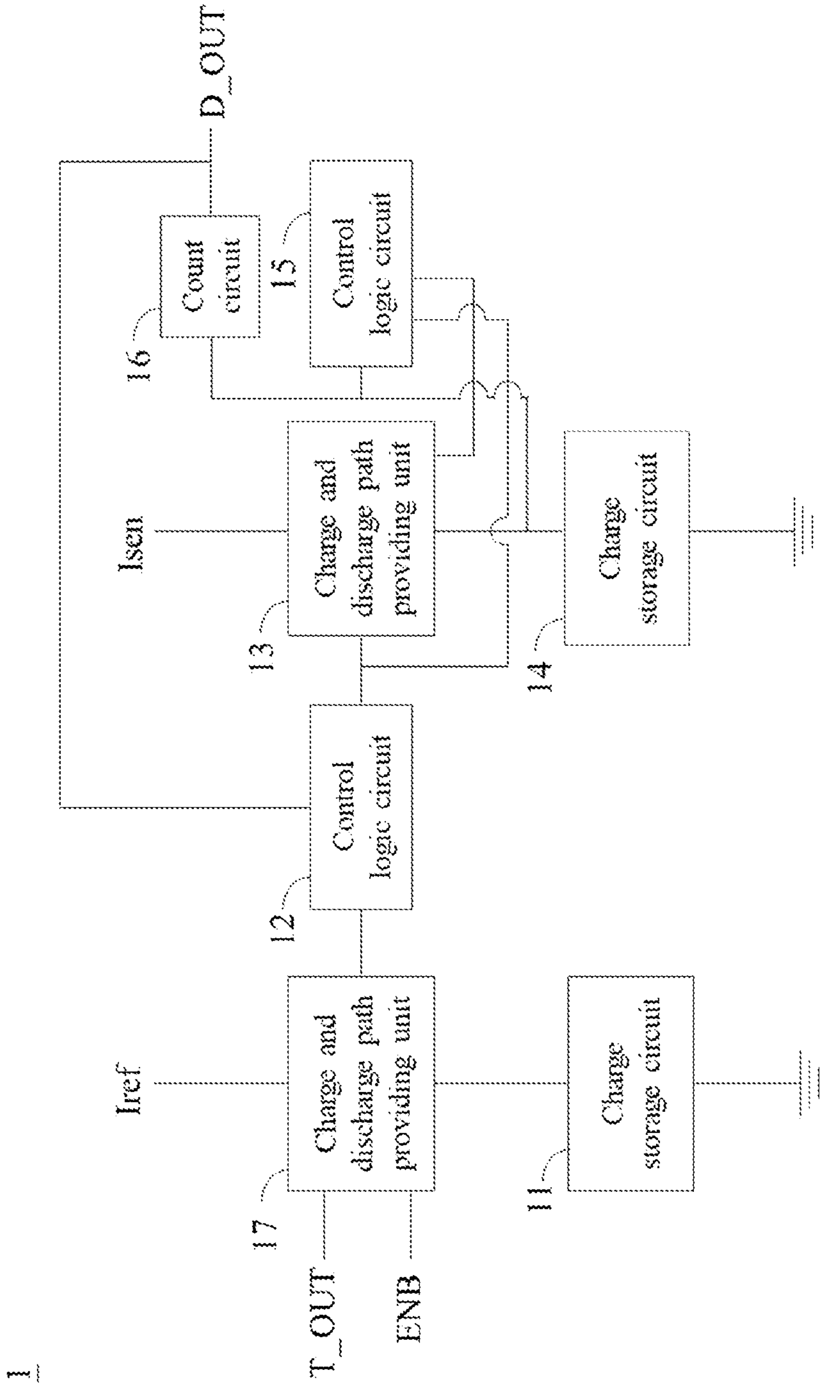
FIG. 1 is a block diagram of an overcurrent detection circuit according to a first embodiment of the present disclosure.

Now, reference will be made in detail to exemplary embodiments of the present disclosure, exemplary embodiments of which are illustrated in the accompanying drawings. In the case of possibility, the same reference numbers will be used in the drawings and the description to refer the same or similar parts. In addition, the practice of the exemplary embodiments is only one implementation of the design concept of the present disclosure, and the following exemplary embodiments are not intended to limit the present disclosure.

An embodiment of the present disclosure mainly provides an overcurrent detection circuit, which is configured to determine whether an output current of a low-dropout regulator is an overcurrent. The overcurrent detection circuit of the present disclosure is designed with two charge storage circuits, a control module and a counter circuit. The control module controls and provides charge paths of the two charge storage circuits, so that the two charge storage circuits are charged by a reference current and a sensed current respectively. The sensed current is generated by an output current of the low-dropout regulator. The counter circuit obtains a voltage of the charge storage circuit charged by the sensed current, and counts accordingly. The counter circuit outputs an overcurrent detection signal when the counting reaches a specific value. In the case of the output current being the overcurrent, the counter circuit counts to the specific value before the charge storage circuit is charged to a specific voltage by the reference current. Also, in the case of the output current not being the overcurrent, the charge storage circuit is charged to the specific voltage by the reference current before the counter circuit counts to the specific value. Compared with the prior art, the overcurrent detection circuit of the present disclosure does not need to use an operational amplifier and a comparator, and thus the circuit area and the complexity of circuit design can be reduced.

Next, referring to FIG. 1, FIG. 1 is a block diagram of an overcurrent detection circuit according to a first embodiment of the present disclosure. The overcurrent detection circuit 1 comprises charge storage circuits 11, 14, control logic circuits 12, 15, charge and discharge path providing units 13, 17 and a counter circuit 16. The charge and discharge path providing unit 17 is electrically connected to the charge storage circuit 11 and the control logic circuit 12. The control logic circuit 12 is electrically connected to the charge storage circuit 11 through the charge and discharge path providing unit 17. The charge and discharge path providing unit 13 is electrically connected to the control logic circuit 12. The charge storage circuit 14 is electrically connected to the charge and discharge path providing unit 13. The control logic circuit 15 is electrically connected to the charge storage circuit 14, the charge and discharge path providing unit 13 and the control logic circuit 12.

The charge storage circuit 11 is configured to be charged by a reference current Iref, wherein it takes a first specific time to charge a voltage of the charge storage circuit 11 from a first initial voltage to a first specific voltage. The charge and discharge path providing unit 17 is controlled by an overcurrent detection disable signal ENB and a time reaching signal T_OUT to determine whether to provide the charge path to the reference current Iref to charge the charge storage circuit 11. The overcurrent detection disable signal ENB is configured to disable the overcurrent detection circuit 1 (that is, an inverted signal of an overcurrent detection enable signal), and the time reaching signal T_OUT is configured to indicate that the voltage of the charge storage circuit 11 is charged to the first specific voltage.

The control logic circuit 12 generates a first charge and discharge path control signal to the charge and discharge path providing unit 13 and the control logic circuit 15 according to the voltage of charge storage circuit 11 and an overcurrent detection signal D_OUT. The charge and discharge path providing unit 13 is configured to receive the first charge and discharge path control signal generated by the control logic circuit 12, a second charge and discharge path control signal generated by the control logic circuit 15 and a sensed current Isen. In addition, the sensed current Isen is generated by an output current of a low-dropout regulator. The charge and discharge path providing unit 13 is controlled by the first charge and discharge path control signal and the second charge and discharge path control signal to determine whether to provide the charge path to the sensed current Isen to charge the charge storage circuit 14. Moreover, it takes a second specific time to charge the voltage of the charge storage circuit 14 from a second initial voltage to a specific voltage, wherein the second specific time is less than the first specific time. The control logic circuit 15 generates the second charge and discharge path control signal according to the voltage of the charge storage circuit 14 and the first charge and discharge path control signal.

By controlling the charge and discharge path providing unit 13 via the control logic circuit, the voltage of the charge storage circuit 14 will be discharged after being charged from the second initial voltage to the second specific voltage. Then, the voltage of the charge storage circuit 14 will be charged again when the charge and discharge path providing unit 13 provides the charge path next time. The counter circuit 16 outputs the overcurrent detection signal D_OUT according to the voltage of the charge storage circuit 14 when the counter circuit 14 counts to the specific value. The count value of the counter circuit 16 is increased by 1 when the voltage of the charge storage circuit 14 is the second specific voltage.

In this way, through the above-mentioned structure, in the case of the output current being the overcurrent, the counter circuit 16 counts to the specific value before the voltage of the charge storage circuit 11 is charged to the first specific voltage. Also, in the case of the output current not being the overcurrent, the voltage of the charge storage circuit 11 is charged to the first specific voltage before the counter circuit 16 counts to the specific value. As a result, the technical solution of the overcurrent detection provided by the present disclosure can be realized without using an operational amplifier and a comparator.

Figure 2:
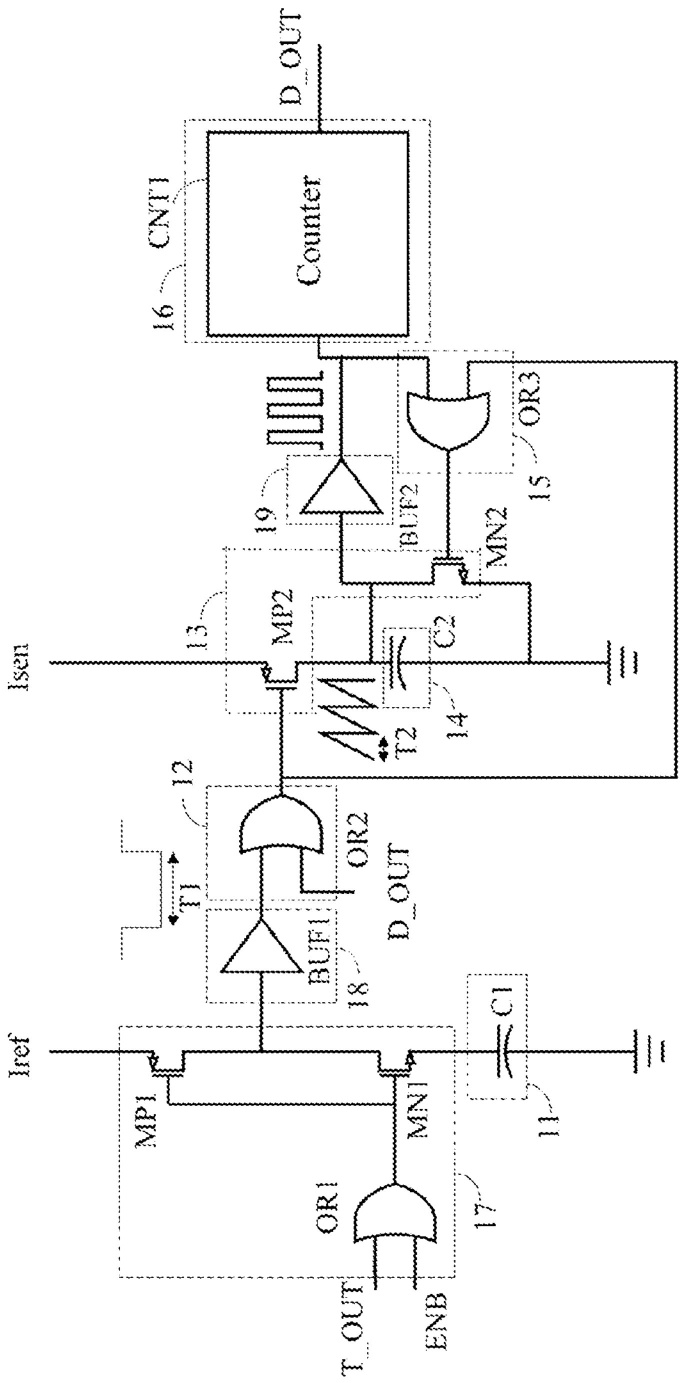
FIG. 2 is circuit diagram of an overcurrent circuit according to a second embodiment of the present disclosure.

Referring to FIG. 1 and FIG. 2, FIG. 2 is a circuit diagram of an overcurrent detection circuit according to a second embodiment of the present disclosure. Different from the first embodiment of FIG. 1, an overcurrent detection circuit 1' further comprises pulse shaping circuits 18 and 19. The pulse shaping circuit 18 is electrically connected between the charge and discharge path providing unit 17 and the control logic circuit 12, and the pulse shaping circuit 19 is electrically connected between the charge storage circuit 14 and the counter circuit 16. The pulse shaping circuit 18 may comprise a buffer BUF1, and the pulse shaping circuit 19 may comprise a buffer BUF2, and the present disclosure is not limited thereto.

In the second embodiment, the charge storage circuit 11 comprises a capacitance C1, the charge storage circuit 14 comprises a capacitance C2, the control logic circuit 12 comprises an OR gate OR2, the counter circuit 16 comprises a counter CNT1, and the control logic circuit 15 comprises an OR gate OR3. Because the second specific time must be less than the first specific time, the capacitance value of the capacitance C2 is designed to be K times the capacitance value of the capacitance C1, wherein the K is a number greater than 1. Furthermore, the charge and discharge path providing unit 17 comprises an OR gate OR1, a P-type transistor MP1 and an N-type transistor MN1, and the charge and discharge path providing unit 13 comprises a P-type transistor MP2 and an N-type transistor MN2.

The OR gate OR1 is configured to receive the overcurrent detection disable signal ENB and the time reaching signal T_OUT, and generate a first logic operation signal. The first logic operation signal is a result of a logical OR operation of the overcurrent detection disable signal ENB and the time reaching signal T_OUT. A gate of the P-type transistor MP1 is electrically connected to a gate of the N-type transistor MN1, and is configured to receive the first logic operation signal. A source of the P-type transistor MP1 is configured to receive the reference current Iref, a source of the N-type transistor MN1 is electrically connected to one end of the capacitance C1, the other end of the capacitance C1 is electrically connected to a ground voltage or a low voltage, and a drain of the P-type transistor MP1 is electrically connected to a drain of the N-type transistor MN1 and the buffer BUF1.

Through such the structure, the capacitance C1 will be charged by the reference Iref when the overcurrent detection is enabled and a voltage of the one end of the capacitance C1 is not charged to the first specific voltage. FIG. 2 shows an output signal of the buffer BUF1. The time when the voltage at the one end of the capacitance C1 is charged from the first initial voltage to the first specific voltage is a first specific time T1. The first initial voltage is related to a voltage electrically connected to the other end of the capacitance C1. The first specific voltage is a threshold voltage that can make an output signal of the OR gate OR2 be transient. As soon as the one end of the capacitance C1 is charged to the first specific voltage, the capacitance C1 is not provided with the charge path and is discharged.

The OR gate OR2 performs the logical OR operation on overcurrent detection signal D_OUT and the output signal of the buffer BUF1 to generate the first charge and discharge path control signal. The OR gate OR3 performs the logical OR operation on an output signal of the buffer BUF2 and the first charge and discharge path control signal to generate the second charge and discharge path control signal. A source of the P-type transistor MP2 is configured to receive the sensed current Isen, a gate of the P-type transistor MP2 is configured to receive the first charge and discharge path control signal, a drain of the P-type transistor MP2 and a drain of the N-type transistor MN1 are electrically connected to one end of the capacitance C2, the other end of the capacitance C2 is electrically connected to the ground voltage and the low voltage, and a gate of the N-type transistor MN2 is configured to receive the second charge and discharge path control signal.

Through such the structure, when the overcurrent detection is enabled and the voltage of the one end of the capacitance C1 is not charged to the first specific voltage, the capacitance C2 is discharged after a voltage of the one end of the capacitance C2 is charged from the second initial voltage to the second specific voltage. Then, after discharged, the capacitance C2 is charged from the second initial voltage to the second specific voltage again, so as to make the counter CNT1 counts continuously. Whether the counter CNT1 counts to the specific value within the specific time T1 can be used to determine whether the overcurrent occurs. If the overcurrent occurs, the counter CNT1 is reset after the overcurrent detection signal D_OUT is output. If no overcurrent occurs, the counter CNT1 is reset after the voltage of the one end of the capacitance C1 is charged to the first specific voltage (i.e., the first specific time is reached).

FIG. 2 shows the output signal of the buffer BUF2 and the voltage of the one end of the capacitance C2. The time when the voltage at the one end of the capacitance C2 is charged from the second initial voltage to the second specific voltage is a second specific time T2. The second initial voltage is related to the voltage electrically connected to the other end of the capacitance C2, and the second specific voltage is a threshold voltage that can make the counter CNT1 count and make the output signal of the OR gate OR3 be transient. Additionally, the voltage wave at the one end of the capacitance C2 is a toothed wave, and after passing through the buffer BUF2, the voltage wave is a square pulse wave.

If the sensed current Isen is much higher than the reference current Iref, the counter CNT1 counts to the specific value and generate the overcurrent detection signal D_OUT before the first specific time T1 reaches. Through the capacitance formula C=QN, the formula C2=Q2/V2=K*Q1N1 can be calculated. It is assumed that the threshold voltages of the transition states are all the same (i.e., the first specific voltage is equal to the second specific voltage), then Q2=K*Q1 can be obtained, that is, Isen*T2=K*Iref*T1. When the first specific time T1 is just equal to DF*T2 (DF is the specific value of the counter CNT1), Isen*T2=K*Iref*DF*T2, Isen=K*DF*Iref can be obtained. Moreover, the sensed current is M times the output current Iload, that is, Isen=M*Iload. Finally, Iload=M*K*DF*Iref can be obtained. As a result, the magnitude that the output current Iload is the overcurrent can be determined by changing the specific value DF of the counter CNT1.

Referring to FIG. 2 continuously, the charge and discharge path providing unit 17 in the embodiment of FIG. 2 can be removed. Therefore, the reference current Iref can charge the charge storage circuit 11 directly, and the control logic circuit 12 is electrically connected to the charge storage circuit 11 directly. Here, it can be designed that the reference current Iref is provided only when the overcurrent detection circuit 1' is enabled and the time reaching signal T_OUT is not generated. Furthermore, the control logic circuit 15 can be implemented with a buffer instead. At this time, the control logic circuit 15 will no longer be electrically connected to the control logic circuit 12. The control logic circuit 15 generates the second charge and discharge path control signal to the charge and discharge path providing unit 13 according to the voltage of the charge storage circuit 14. Here, it can be designed that the sensed current Isen is provided only when the overcurrent detection circuit 1 is enabled, the time reaching signal T_OUT is not generated, and the counter circuit 16 does not count to the specific value. Further, the pulse shaping circuits 18 and 19 in FIG. 2 are also not necessary components and can be removed directly. However, generally in a noise environment, the pulse shaping circuits 18 and 19 can make the overcurrent detection circuit 1' have better anti-noise capability, so as to improve the accuracy of the overcurrent detection signal D_OUT.

Referring to FIG. 1 and FIG. 2 at the same time, it can be known from the above-mentioned embodiments that the overcurrent detection circuits 1 and 1' of the present disclosure are designed with the two charge storage circuits 11, 14, the control module and the counter circuit 16. The control module controls and provides the charge paths of the two charge storage circuits 11 and 14, so that the two charge storage circuits 11 and 14 are charged by the reference current Iref and the sensed current Isen. The counter circuit 16 obtains the voltage of the charge storage circuit 14 charged by the sensed current Isen and counts accordingly. The counter circuit 16 outputs the overcurrent detection signal D_OUT before it counts to the specific value. In the case of the output current being the overcurrent, the counter circuit 16 counts to the specific value before the charge storage circuit 11 is charged by the reference current Iref to the specific voltage. Also, in the case of the output current not being the overcurrent, the charge storage circuit 11 is charged by the reference current Iref to the specific voltage before the counter circuit 16 counts to the specific value. The control module can be implemented by the charge and discharge path providing units 13, 17, the control logic circuits 12 and 15 in FIG. 1. Also, the control module can be implemented by the charge and discharge path providing units 13, 17, the control logic circuits 12, 15 and the pulse shaping circuits 18 and 19, and the present disclosure is not limited thereby.

Figure 3:
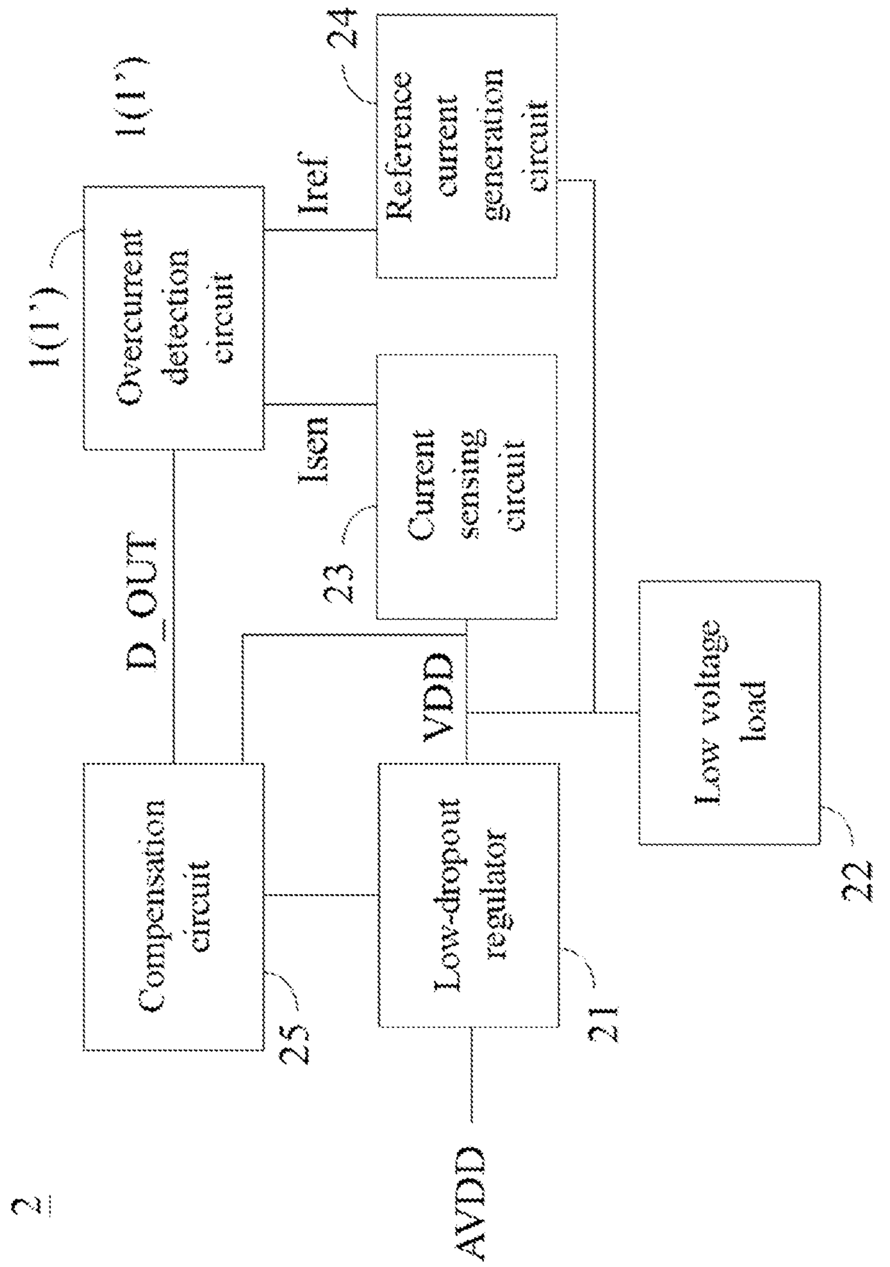
FIG. 3 is block diagram of a low-dropout voltage regulator system using the overcurrent detection circuit of the first or second embodiments of the present disclosure.

Referring to FIG. 3, FIG. 3 is block diagram of a low-dropout voltage regulator system using the overcurrent detection circuit of the first or second embodiment of the present disclosure. A low-dropout voltage regulator system 2 comprises a low-dropout regulator 21, a low voltage load 22, a current sensing circuit 23, a reference current generation circuit 24, a compensation circuit 25 and the overcurrent circuit 1 (or 1'). The low-dropout regulator 21 is electrically connected to the low voltage load 22, the current sensing circuit 23, the reference current generation circuit 24 and the compensation circuit 25, and is electrically connected to the overcurrent circuit 1 (or 1') through the current sensing circuit 23. The overcurrent circuit 1 (or 1') is electrically connected to the current sensing circuit 23, the reference current generation circuit 24 and the compensation circuit 25.

The low-dropout regulator 21 is configured to receive a first system voltage AVDD, and performs low-dropout voltage regulation on the first system voltage AVDD to generate a second system voltage VDD. The second system voltage VDD is provided to the low voltage load 22, the compensation circuit 25, the current sensing circuit 23 and the reference current generation circuit 24. The current sensing circuit 23 is configured to sense the output current of the low-dropout regulator 21 to generate the sensed current Isen. The reference current generation circuit 24 is configured to generate the reference current Iref. The overcurrent circuit 1 (or 1') is configured to obtain the sensed current Isen and the reference current Iref, and determine whether the output current of the low-dropout regulator 21 is the overcurrent. If the output current of the low-dropout regulator 21 is the overcurrent, the overcurrent detection signal D_OUT is output to the compensation circuit 25, so that the compensation circuit 25 can adjust the low-dropout regulator 21 to avoid overcurrent occurring continuously.

Consequently, the present disclosure has the advantages as follows. Firstly, different from the circuit structure in the prior art, the overcurrent detection circuit of the present disclosure does not need to use a comparator and an operational amplifier at all. Hence, the design complexity in the circuit characteristics, area and quiescent current can be greatly reduced when designing an overcurrent detection circuit of a low-dropout regulator. Secondly, the overcurrent detection circuit of the present disclosure closes automatically after the detection is completed. The overcurrent detection can be realized without increasing the overall quiescent current of the low-dropout regulator. That is, the overcurrent detection circuit can be turned on when necessary, so the present disclosure is suitable for applications in low-power microcontrollers. Thirdly, the overcurrent detection circuit of the present disclosure is easy to design and change the level of the current detection, and it is also easy to perform the error correction.

It should be understood that the examples and embodiments described herein are for illustrative purpose only, and various modifications or changes in view thereof will be suggested to those skilled in the art, and will be included in the spirit and scope of the application and the appended within the scope of the claims.

What is claimed is:

1. An overcurrent detection circuit, comprising:

a first charge storage circuit, configured to be charged by a reference current, wherein it takes a first specific time to charge a first voltage of the first charge storage circuit from a first initial voltage to a first specific voltage;

a first control logic circuit, electrically connected to the first charge storage circuit, and configured to generate a first charge and discharge path control signal based on the first voltage and an overcurrent detection signal;

a first charge and discharge path providing unit, electrically connected to the first control logic circuit, and configured to receive the first charge and discharge path control signal, a second charge and discharge path control signal and a sensed current, wherein the sensed current is generated based on an output current of a low-dropout regulator;

a second charge storage circuit, electrically connected to the first charge and discharge path providing unit, wherein the first charge and discharge path providing unit is controlled by the first charge and discharge path control signal and the second charge and discharge path control signal to determine whether to provide a charge path for the sensed current to charge the second charge storage circuit or not, and it takes a second specific time to charge a second voltage of the second charge storage circuit from a second initial voltage to a second specific voltage, wherein the second specific time is less than the first specific time;

a second control logic circuit, electrically connected to the second charge storage circuit and the first charge and discharge path providing unit, and configured to generate the second charge and discharge path control signal based on the second voltage; and a counter circuit, electrically connected to the second charge storage circuit and the first control logic circuit, and configured to count based on the second voltage, wherein the counter circuit outputs the overcurrent detection signal when the counter circuit counts to a specific value.

2. The overcurrent detection circuit according to claim 1, wherein when the output current is an overcurrent, the counter circuit counts to the specific value before the first voltage is charged to the first specific voltage, wherein when the output current is not the overcurrent, the first voltage is charged to the first specific voltage before the counter circuit counts to the specific value.

3. The overcurrent detection circuit according to claim 1, wherein the second control logic unit is further electrically connected to the first control logic circuit, and the second control logic circuit generates the second charge and discharge path control signal based on the second voltage and the first charge and discharge path control signal.

4. The overcurrent detection circuit according to claim 3, further comprising:

a second charge and discharge path providing unit, electrically connected to the first charge storage circuit and the first control logic circuit, and configured to be controlled by an overcurrent detection disable signal and a time reaching signal to determine whether to provide one another charge path for the reference current to charge the first charge storage circuit, wherein the overcurrent detection disable signal is configured to disable the overcurrent detection circuit, and the time reaching signal is configured to indicate that the first voltage is charged to the first specific voltage.

5. The overcurrent detection circuit according to claim 4, further comprising:

a first pulse shaping circuit, electrically connected between the second charge and discharge path providing unit and the first control logic circuit; and a second pulse shaping circuit, electrically connected between the second charge storage circuit and the counter circuit;

wherein the first pulse shaping circuit comprises a first buffer, and the second pulse shaping circuit comprises a second buffer.

6. The overcurrent detection circuit according to claim 4, wherein the second charge and discharge path providing unit comprises:

a first OR gate, configured to receive the overcurrent detection disable signal and the time reaching signal, and generate a first logic operation signal;

a first P-type transistor; and a first N-type transistor;

wherein a gate of the first P-type transistor is electrically connected to a gate of the first N-type transistor, and configured to receive the first logic operation signal, a source of the first P-type transistor is configured to receive the reference current, a source of the first N-type transistor is electrically connected to the first charge storage circuit, and a drain of the first P-type transistor is electrically connected to a drain of the first N-type transistor.

7. The overcurrent detection circuit according to claim 6, wherein the first charge storage circuit comprises a first capacitance, the second charge storage circuit comprises a second capacitance, the first control logic circuit comprises a second OR gate, and the second control logic circuit comprises a third OR gate.

8. The overcurrent detection circuit according to claim 4, wherein the first charge and discharge path providing unit comprises:

a second P-type transistor; and a second N-type transistor;

wherein a source of the second P-type transistor receives the sensed current, a gate of the second P-type transistor receives the first charge and discharge path control signal, a drain of the second P-type transistor and a drain of the second N-type transistor are electrically connected to the second charge storage circuit, and a gate of the second N-type transistor receives the second charge and discharge path control signal.

9. An overcurrent detection circuit, comprising:

a first charge storage circuit, configured to be charged by a reference current, wherein it takes a first specific time to charge a first voltage of the first charge storage circuit from a first initial voltage to a first specific voltage;

a second charge storage circuit, configured to be charged by a sensed current, wherein it takes a second specific time to charge a second voltage of the second charge storage circuit from a second initial voltage to a second specific voltage, and the second specific time is less than the first specific time, and the sensed current is generated by an output current of a low-dropout regulator;

a counter circuit, electrically connected to the second charge storage circuit, and configured to receive the second voltage, and configured to count based on the second voltage, wherein the counter circuit outputs the overcurrent detection signal when the counter circuit counts to a specific value; and a control module, electrically connected to the first charge storage circuit, the second charge storage circuit and the counter circuit, and configured to control and provide a charge path of the first charge storage circuit and a charge path of the second charge storage circuit;

wherein in a condition that the output current is an overcurrent, the counter circuit counts to the specific value before the first voltage is charged to the first specific voltage; and wherein in a condition that the output current is not the overcurrent, the first voltage is charged to the first specific voltage before the counter circuit counts to the specific value.

10. A low-dropout voltage regulator system, comprising:

an overcurrent detection circuit, comprising:

a first charge storage circuit, configured to be charged by a reference current, wherein it takes a first specific time to charge a first voltage of the first charge storage circuit from a first initial voltage to a first specific voltage;

a first control logic circuit, electrically connected to the first charge storage circuit, and configured to generate a first charge and discharge path control signal based on the first voltage and an overcurrent detection signal;

a first charge and discharge path providing unit, electrically connected to the first control logic circuit, and configured to receive the first charge and discharge path control signal, a second charge and discharge path control signal and a sensed current, wherein the sensed current is generated based on an output current of a low-dropout regulator;

a second charge storage circuit, electrically connected to the first charge and discharge path providing unit, wherein the first charge and discharge path providing unit is controlled by the first charge and discharge path control signal and the second charge and discharge path control signal to determine whether to provide a charge path for the sensed current to charge the second charge storage circuit, and it takes a second specific time to charge a second voltage of the second charge storage circuit from a second initial voltage to a second specific voltage, wherein the second specific time is less than the first specific time;

a second control logic circuit, electrically connected to the second charge storage circuit and the first charge and discharge path providing unit, and configured to generate the second charge and discharge path control signal based on the second voltage; and a counter circuit, electrically connected to the second charge storage circuit and the first control logic circuit, and configured to count based on the second voltage, wherein the counter circuit outputs the overcurrent detection signal when the counter circuit counts to a specific value, wherein the overcurrent detection circuit is electrically connected to the low-dropout regulator; and the low-dropout regulator.

11. The low-dropout voltage regulator system according to claim 10, wherein when the output current is an overcurrent, the counter circuit counts to the specific value before the first voltage is charged to the first specific voltage; and when the output current is not the overcurrent, the first voltage is charged to the first specific voltage before the counter circuit counts to the specific value.

12. The low-dropout voltage regulator system according to claim 10, wherein the second control logic unit is further electrically connected to the first control logic circuit, and the second control logic circuit generates the second charge and discharge path control signal based on the second voltage and the first charge and discharge path control signal.

13. The low-dropout voltage regulator system according to claim 12, further comprising:

a second charge and discharge path providing unit, electrically connected to the first charge storage circuit and the first control logic circuit, and configured to be controlled by an overcurrent detection disable signal and a time reaching signal to determine whether to provide one another charge path for the reference current to charge the first charge storage circuit, wherein the overcurrent detection disable signal is configured to disable the overcurrent detection circuit, and the time reaching signal is configured to indicate that the first voltage is charged to the first specific voltage.

14. The low-dropout voltage regulator system according to claim 13, further comprising:

a first pulse shaping circuit, electrically connected between the second charge and discharge path providing unit and the first control logic circuit; and a second pulse shaping circuit, electrically connected between the second charge storage circuit and the counter circuit;

wherein the first pulse shaping circuit comprises a first buffer, and the second pulse shaping circuit comprises a second buffer.

15. The low-dropout voltage regulator system according to claim 13, wherein the second charge and discharge path providing unit comprises:

a first OR gate, configured to receive the overcurrent detection disable signal and the time reaching signal, and generate a first logic operation signal;

a first P-type transistor; and a first N-type transistor;

wherein a gate of the first P-type transistor is electrically connected to a gate of the first N-type transistor, and configured to receive the first logic operation signal, a source of the first P-type transistor is configured to receive the reference current, a source of the first N-type transistor is electrically connected to the first charge storage circuit, and a drain of the first P-type transistor is electrically connected to a drain of the first N-type transistor.

16. The low-dropout voltage regulator system according to claim 15, wherein the first charge storage circuit comprises a first capacitance, the second charge storage circuit comprises a second capacitance, the first control logic circuit comprises a second OR gate, and the second control logic circuit comprises a third OR gate.

17. The low-dropout voltage regulator system according to claim 13, wherein the first charge and discharge path providing unit comprises:

a second P-type transistor; and a second N-type transistor;

wherein a source of the second P-type transistor receives the sensed current, a gate of the second P-type transistor receives the first charge and discharge path control signal, a drain of the second P-type transistor and a drain of the second N-type transistor are electrically connected to the second charge storage circuit, and a gate of the second N-type transistor receives the second charge and discharge path control signal.

* * * * *